United States Patent
Beard et al.

(10) Patent No.: US 10,353,826 B2
(45) Date of Patent: Jul. 16, 2019

(54) METHOD AND APPARATUS FOR FAST CONTEXT CLONING IN A DATA PROCESSING SYSTEM

(71) Applicant: ARM LTD, Cambridge (GB)

(72) Inventors: Jonathan Curtis Beard, Austin, TX (US); Roxana Rusitoru, Cambridge (GB); Curtis Glenn Dunham, Austin, TX (US)

(73) Assignee: Arm Limited, Cambridge (GB)

( * ) Notice: Subject to any disclaimer, the term of this patent is extended or adjusted under 35 U.S.C. 154(b) by 5 days.

(21) Appl. No.: 15/649,976

(22) Filed: Jul. 14, 2017

(65) Prior Publication Data

US 2019/0018794 A1    Jan. 17, 2019

(51) Int. Cl.
*G06F 9/30* (2018.01)
*G06F 9/46* (2006.01)
(Continued)

(52) U.S. Cl.
CPC ...... *G06F 12/1063* (2013.01); *G06F 9/30123* (2013.01); *G06F 9/461* (2013.01);
(Continued)

(58) Field of Classification Search
CPC .............. G06F 3/00; G06F 3/06–0689; G06F 5/00–16; G06F 9/00–548;
(Continued)

(56) References Cited

U.S. PATENT DOCUMENTS

| 4,347,565 A | 8/1982 | Kaneda et al. |
| 4,792,897 A | 12/1988 | Gotou et al. |

(Continued)

FOREIGN PATENT DOCUMENTS

| EP | 3 128 415 | 2/2017 |
| WO | WO 2016/160220 | 10/2016 |

(Continued)

OTHER PUBLICATIONS

Memory Management Basics ; Apr. 10, 2014; retrieved from http://www.idc-online.com/technical_references/pdfs/information_technology/Memory_Management_Basics.pdf on Oct. 10, 2018 (Year: 2014).*

(Continued)

*Primary Examiner* — Daniel C. Chappell
(74) *Attorney, Agent, or Firm* — Leveque IP Law, P.C.

(57) ABSTRACT

A data processing system includes a memory system, a first processing element, a first address translator that maps virtual addresses to system addresses, a second address translator that maps system address to physical addresses, and a task management unit. A first program task uses a first virtual memory space that is mapped to a first system address range using a first table. The context of the first program task includes an address of the first table and is cloned by creating a second table indicative of a mapping from a second virtual address space to a second range of system addresses, where the second range is mapped to the same physical addresses as the first range until a write occurs, at which time memory is allocated and the mapping of the second range is updated. The cloned context includes an address of the second table.

16 Claims, 7 Drawing Sheets

(51) Int. Cl.
*G06F 9/48* (2006.01)
*G06F 9/50* (2006.01)
*G06F 12/0864* (2016.01)
*G06F 12/1009* (2016.01)
*G06F 12/1045* (2016.01)

(52) U.S. Cl.
CPC .......... *G06F 9/4881* (2013.01); *G06F 9/5016* (2013.01); *G06F 12/0864* (2013.01); *G06F 12/1009* (2013.01); *G06F 2212/6032* (2013.04); *G06F 2212/6046* (2013.01); *G06F 2212/657* (2013.01)

(58) Field of Classification Search
CPC ..... G06F 11/00–3696; G06F 12/00–16; G06F 13/00–4295; G06F 15/00–825; G06F 17/00–5095; G06F 21/00–88; G06F 2003/0691–0698; G06F 2009/3883; G06F 2009/45562–45595; G06F 2201/00–885; G06F 2209/00–549; G06F 2211/00–902; G06F 2212/00–7211; G06F 2221/00–2153
See application file for complete search history.

(56) References Cited

U.S. PATENT DOCUMENTS

| | | | |
|---|---|---|---|
| 5,361,337 A * | 11/1994 | Okin | G06F 9/3851 711/140 |
| 5,426,750 A | 6/1995 | Becker et al. | |
| 5,577,231 A | 11/1996 | Scalzi et al. | |
| 5,752,275 A | 5/1998 | Hammond | |
| 5,867,649 A * | 2/1999 | Larson | G06F 8/314 709/201 |
| 6,021,476 A | 2/2000 | Segars | |
| 6,345,241 B1 * | 2/2002 | Brice | G06F 9/45558 703/21 |
| 6,349,355 B1 | 2/2002 | Draves et al. | |
| 6,633,963 B1 | 10/2003 | Ellison et al. | |
| 6,704,873 B1 * | 3/2004 | Underwood | H04L 63/02 709/223 |
| 6,715,145 B1 * | 3/2004 | Bowman-Amuah | G06F 8/20 718/100 |
| 6,731,288 B2 * | 5/2004 | Parsons | G06T 15/005 345/426 |
| 6,789,156 B1 | 9/2004 | Waldspurger | |
| 6,822,959 B2 * | 11/2004 | Galbi | G06F 9/30123 370/392 |
| 7,181,594 B2 * | 2/2007 | Wilkinson, III | G06F 9/462 712/11 |
| 7,225,300 B1 | 5/2007 | Choquette et al. | |
| 7,343,603 B1 * | 3/2008 | Fresko | G06F 9/4403 711/1 |
| 7,356,667 B2 | 4/2008 | Harris et al. | |
| 7,373,466 B1 | 5/2008 | Conway | |
| 7,424,599 B2 * | 9/2008 | Kissell | G06F 8/4442 712/228 |
| 7,437,724 B2 * | 10/2008 | Wolrich | G06F 9/30101 712/220 |
| 7,472,253 B1 | 12/2008 | Cameron et al. | |
| 7,512,769 B1 | 3/2009 | Lowell et al. | |
| 7,668,165 B2 * | 2/2010 | Hoskote | H04L 45/745 370/392 |
| 8,250,519 A1 | 8/2012 | Budko et al. | |
| 8,327,187 B1 | 12/2012 | Metcalf | |
| 8,386,745 B2 | 2/2013 | Kegel et al. | |
| 8,656,397 B2 | 2/2014 | Eidus et al. | |
| 8,667,249 B2 * | 3/2014 | Baxter | G06F 12/109 711/206 |
| 8,850,168 B2 * | 9/2014 | Yamamoto | G06F 9/3851 712/228 |
| 8,984,255 B2 | 3/2015 | Hsu et al. | |
| 9,081,501 B2 * | 7/2015 | Asaad | G06F 15/76 |
| 9,081,706 B2 | 7/2015 | Koka et al. | |
| 9,122,714 B2 | 9/2015 | Varadarajan et al. | |
| 9,208,103 B2 | 12/2015 | Kessler et al. | |
| 9,235,529 B2 | 1/2016 | Koka et al. | |
| 9,250,901 B2 * | 2/2016 | Sodhi | G06F 9/30123 |
| 9,251,089 B2 | 2/2016 | Gschwind | |
| 9,268,694 B2 | 2/2016 | Snyder et al. | |
| 9,367,459 B2 * | 6/2016 | Yamashita | G06F 9/5016 |
| 9,582,312 B1 * | 2/2017 | Karppanen | G06F 9/461 |
| 9,639,476 B2 | 5/2017 | Chin et al. | |
| 9,645,941 B2 | 5/2017 | Mukherjee et al. | |
| 9,690,714 B1 | 6/2017 | Sites | |
| 9,785,557 B1 | 10/2017 | Frey et al. | |
| 9,996,386 B2 * | 6/2018 | Rauchfuss | G06F 9/461 |
| 10,037,227 B2 * | 7/2018 | Therien | G06F 1/3287 |
| 10,114,958 B2 | 10/2018 | Sell | |
| 10,133,675 B2 | 11/2018 | Hansson et al. | |
| 10,180,913 B1 | 1/2019 | Aingaran et al. | |
| 2002/0026502 A1 * | 2/2002 | Phillips | H04L 29/06 709/219 |
| 2004/0064668 A1 | 4/2004 | Kjos et al. | |
| 2004/0117593 A1 | 6/2004 | Uhlig et al. | |
| 2004/0215893 A1 | 10/2004 | Emerson et al. | |
| 2005/0010728 A1 | 1/2005 | Piry et al. | |
| 2005/0138515 A1 * | 6/2005 | Hyduke | G06F 11/261 714/741 |
| 2005/0165758 A1 | 7/2005 | Kasten et al. | |
| 2005/0273571 A1 | 12/2005 | Lyon et al. | |
| 2006/0253894 A1 * | 11/2006 | Bookman | H04L 63/0428 726/2 |
| 2006/0277390 A1 | 12/2006 | Zuraski et al. | |
| 2007/0180197 A1 * | 8/2007 | Wright | G06F 12/0808 711/141 |
| 2007/0186054 A1 | 8/2007 | Kruckmeyer et al. | |
| 2008/0104557 A1 | 5/2008 | Gopaladrishnan et al. | |
| 2008/0270653 A1 | 10/2008 | Balle et al. | |
| 2009/0089537 A1 | 4/2009 | Vick et al. | |
| 2009/0113164 A1 | 4/2009 | Rajamony et al. | |
| 2009/0172343 A1 | 7/2009 | Savagaonkar | |
| 2009/0182971 A1 | 7/2009 | Greiner et al. | |
| 2009/0234987 A1 | 9/2009 | Lee et al. | |
| 2011/0113410 A1 * | 5/2011 | Loen | G06F 8/456 717/149 |
| 2011/0145542 A1 | 6/2011 | Morrow | |
| 2011/0208935 A1 | 8/2011 | Grisenthwaite | |
| 2013/0179666 A1 | 7/2013 | Yamashita et al. | |
| 2013/0227248 A1 | 8/2013 | Mehta et al. | |
| 2014/0006734 A1 | 1/2014 | Li et al. | |
| 2014/0013074 A1 | 1/2014 | Koka | |
| 2014/0052917 A1 | 2/2014 | Koka et al. | |
| 2014/0208064 A1 | 7/2014 | Basu et al. | |
| 2014/0281363 A1 * | 9/2014 | Tian | G06F 12/10 711/207 |
| 2014/0351519 A1 | 11/2014 | Munoz | |
| 2015/0106571 A1 | 4/2015 | Bernard et al. | |
| 2015/0205885 A1 | 7/2015 | Zhou et al. | |
| 2015/0254104 A1 | 9/2015 | Kessler et al. | |
| 2015/0286639 A1 | 10/2015 | Bordawekar | |
| 2015/0301949 A1 | 10/2015 | Koka et al. | |
| 2015/0301951 A1 | 10/2015 | Bybell et al. | |
| 2015/0325272 A1 | 11/2015 | Murphy | |
| 2016/0085677 A1 | 3/2016 | Loh et al. | |
| 2016/0147555 A1 | 5/2016 | Hepkin | |
| 2016/0239415 A1 | 8/2016 | David et al. | |
| 2016/0283399 A1 | 9/2016 | Das | |
| 2017/0031832 A1 | 2/2017 | Hwang | |
| 2017/0109289 A1 * | 4/2017 | Gonzalez Gonzalez | G06F 12/0895 |
| 2017/0147254 A1 | 5/2017 | Adams et al. | |
| 2017/0153987 A1 | 6/2017 | Gaonkar et al. | |
| 2017/0161194 A1 | 6/2017 | Loh | |
| 2017/0177484 A1 | 6/2017 | Conway | |
| 2017/0185528 A1 | 6/2017 | Hansson et al. | |
| 2017/0236243 A1 | 8/2017 | Smith | |
| 2017/0286421 A1 | 10/2017 | Hayenga et al. | |
| 2018/0018278 A1 | 1/2018 | Bradbury et al. | |
| 2018/0150315 A1 | 5/2018 | Dunham et al. | |

(56) References Cited

U.S. PATENT DOCUMENTS

| | | | |
|---|---|---|---|
| 2018/0150321 | A1 | 5/2018 | Dunham et al. |
| 2018/0150322 | A1 | 5/2018 | Dunham et al. |

FOREIGN PATENT DOCUMENTS

| | | |
|---|---|---|
| WO | WO 2016/162817 | 10/2016 |
| WO | WO 2016/204913 | 12/2016 |

OTHER PUBLICATIONS

CS 422/522 Design & Implementation of Operating Systems Lecture 13: Address Translation; Shao, Zhong; Yale University; Oct. 15, 2015; retrieved from https://web.archive.org/web/20151217223456/http://flint.cs.yale.edu/cs422/lectureNotes/L13.pdf on Oct. 10, 2018 (Year: 2015).*

The fork() System Call; Jun. 13, 2015; retrieved from https://web.archive.org/web/20150613053636/http://www.csl.mtu.edu/cs4411.ck/www/NOTES/process/fork/create.html on Oct. 10, 2018 (Year: 2015).*

A hybrid shared memory heterogeneous execution platform for PCIe-based GPGPUs; Shukla et al.; 20th Annual International Conference on High Performance Computing; Dec. 18-21, 2013 (Year: 2013).*

CloudNet: Dynamic Pooling of Cloud Resources by Live WAN Migration of Virtual Machines; Wood et al.; IEEE/ACM Transactions on Networking, vol. 23, iss. 5, pp. 1568-1583; Oct. 2015 (Year: 2015).*

Anedda et al., "Suspending, migrating and resuming HPC virtual clusters," Future Generation Computer Systems 26, May 20, 2010, pp. 1063-1072.

Basu et al, "Efficient virtual memory for big memory servers," ACM SIGARCH Computer Architecture News—ICSA '13, vol. 41 Issue 3, Jun. 2013, pp. 237-248.

J. Gandhi et al., "Range Translations for Fast Virtual Memory," in IEEE Micro, vol. 36, No. 3, pp. 118-126, May-Jun. 2016. doi: 10.1109/MM.2016.10.

Karakostas et al., "Redundant Memory Mappings for Fast Access to Large Memories," ISCA'15, Jun. 13-17, 2015.

R. W. Pfile, D. A. Wood and S. K. Reinhardt, "Decoupled Hardware Support for Distributed Shared Memory," Computer Architecture, 1996 23rd Annual International Symposium on, May 24, 1996, pp. 34-34. doi: 10.1109/ISCA.1996.10010.

Petter Svard, Benoit Hudzia, Johan Tordsson, and Erik Elmroth. 2011. Evaluation of delta compression techniques for efficient live migration of large virtual machines. In Proceedings of the 7th ACM SIGPLAN/SIGOPS international conference on Virtual execution environments (VEE '11). Jul. 2011, ACM, New York, NY, USA, 111-120. DOI=http://dx.doi.org/10.1145/1952682.1952698.

U.S. Appl. No. 15/361,871, filed Nov. 28, 2016 entitled "Data Processing", Applicant Arm Ltd.

U.S. Appl. No. 15/361,819, filed Nov. 28, 2016 entitled "Data Processing", Applicant Arm Ltd.

U.S. Appl. No. 15/361,770, filed Nov. 28, 2016 entitled "Data Processing", Applicant Arm Ltd.

Arm, "ARMv8-A Address Translation," https://static.docs.arm.com/100940/0100/armv8_a_address%20translation_100940_0100_en.pdf, Feb. 28, 2017.

Yang, Junfeng, "Process and Address Space," https://web.archive.org/web/20170329090956if_/http://www.cs.columbia.edu:80/"junfeng/12sp-w4118/lectures/104-proc.pdf, Mar. 29, 2017.

Oehmke, David W., Nathan L. Binkert, Steven K. Reinhardt and Trevor J Mudge. "Design and Applications of a Virtual Context Architecture." (2004).

Jayneel Gandhi, "Efficient Memory Virtualization," Thesis, University of Wisconsin-Madison, Aug. 19, 2016.

Rouse, Margaret, Definition translation lookaside buffer (TLB), https://whatis.techtarget.com/definition/translation-look-aside-buffer-TLB, Sep. 2014.

Bang, Kwanhu & Park, Sang-Hoon & Jun, Minje & Chung, Eui-Young. (2011). A memory hierarchy-aware metadata management technique for Solid State Disks. Midwest Symposium on Circuits and Systems. 1-4.

C. H. Park, T. Heo, J. Jeong and J. Huh, "Hybrid TLB coalescing: Improving TLB translation coverage under diverse fragmented memory allocations," 2017 ACM/IEEE 44th Annual International Symposium on Computer Architecture (ISCA), Toronto, ON, 2017, pp. 444-456.

Chao-Jui Chang, Jan-Jan Wu, Wei-Chung Hsu, Pangfeng Liu, and Pen-Chung Yew. 2014. Efficient memory virtualization for Cross-ISA system mode emulation. SIGPLAN Not. 49, 7 (Mar. 2014), 117-128.

Grocutt et al., U.S. Appl. No. 15/825,524 unpublished application, filed Nov. 29, 2017.

L. Fiorin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008.

M. D. Flouris and A. Bilas, "Violin: a framework for extensible block-level storage," 22nd IEEE / 13th NASA Goddard Conference on Mass Storage Systems and Technologies (MSST'05), Monterey, CA, USA, 2005, pp. 128-142.

Porquet, J & Greiner, A & Schwarz, C., "NoC-MPU: A secure architecture for flexible co-hosting on shared memory MPSoCs, " Design, Automation & Test. In Europe, 1-4, 2001.

U.S. Appl. No. 15/825,524, filed Nov. 29, 2017, Inventor: Grocutt et al.

* cited by examiner

METHOD AND APPARATUS FOR FAST CONTEXT CLONING IN A DATA PROCESSING SYSTEM

STATEMENT REGARDING FEDERALLY SPONSORED RESEARCH OR DEVELOPMENT

This invention was made with Government support under the Fast Forward 2 contract awarded by DOE. The Government has certain rights in this invention.

CROSS-REFERENCE TO RELATED APPLICATIONS

This application is related to co-pending patent application Ser. No. 15/649,930 entitled "METHOD AND APPARATUS FOR TWO-LAYER COPY-ON-WRITE"; co-pending patent application Ser. No. 15/650,008 entitled "MEMORY NODE CONTROLLER"; and co-pending patent application Ser. No. 15/650,056 entitled "MEMORY ADDRESS TRANSLATION", all filed on the same date as this application, and which are hereby incorporated herein by reference herein in their entirety.

TECHNICAL FIELD

The present disclosure relates to the structure and manner of operation of a data processing system.

BACKGROUND

A data processing apparatus may include one or more processing elements that perform program tasks, such as processes or threads, by executing a program of instructions. Execution of the instructions alters the state of the processing element. A task context is the minimal set of data used by a task that must be saved in order to enable a task to be interrupted, and later continued from the same point. A context may include register values, configuration settings, debug register values, etc.

A program task, such as an execution thread or process, can be executed by processing elements in successive portions, possibly interspersed with portions of execution of other program tasks. Execution can be passed from one processing element to another. To enable this, a process referred to as context switching may take place.

In a context switch, each processing element is configured to save context data relating to a program task following execution of that program task by that processing element; and to load context data, previously saved by that processing element or another of the processing elements, at resumption of execution of a program task.

Context cloning, or the generation of a new context, requires allocation of storage for context data and the storing of initial values of the context data in the allocated storage. This enables a new task to be executed by the processing core.

Some processors have dedicated registers (shadow registers) for storing a context and enabling switching between two processes. However, processing cores may be required to execute a large number of threads or processes in parallel. In such case, allocation and initialization of memory is required each time a new context is to be saved. Memory allocation is usually performed by an operating system (OS), so the performance of the data processing apparatus is impaired.

Accordingly, there is a need for an improved data processing apparatus that provides fast context cloning.

DETAILED DESCRIPTION OF THE EMBODIMENTS

Figure 1:
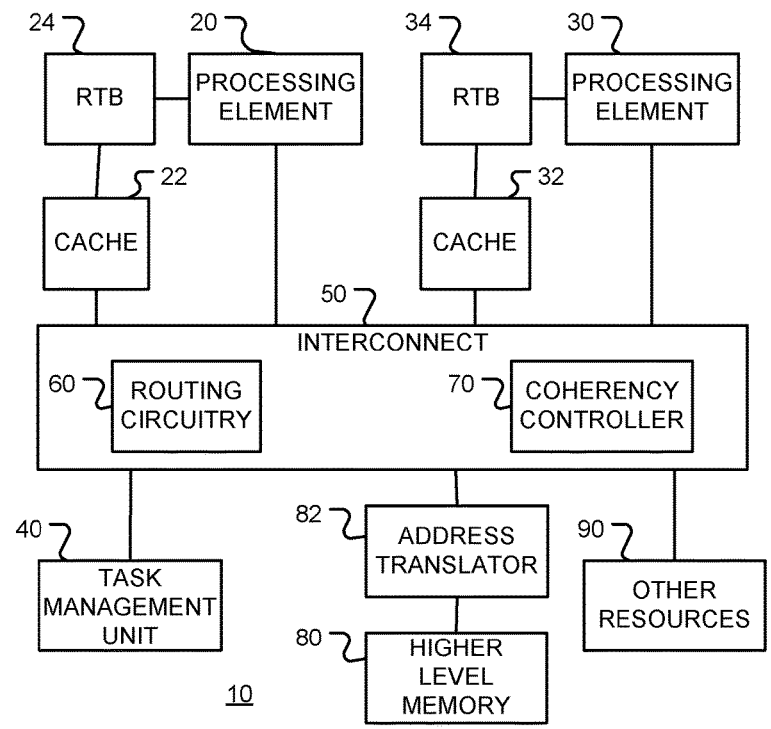
FIG. 1 is a block diagram of a data processing system, consistent with embodiments of the disclosure.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

A data processing apparatus may include one or more processing elements that perform program tasks, such as processes or threads, by executing a program of instructions. Execution of the instructions alters the state of the processing element. A task context is the minimal set of data used by a task that must be saved in order to enable a task to be interrupted, and later continued from the same point. A context may include register values, configuration settings, debug register values, etc.

A program task, such as an execution thread or process, can be executed by processing elements in successive portions, possibly interspersed with portions of execution of other program tasks. Execution can be passed from one processing element to another. To enable this, a process referred to as context switching may take place.

In a context switch, each processing element is configured to save context data relating to a program task following execution of that program task by that processing element; and to load context data, previously saved by that processing element or another of the processing elements, at resumption of execution of a program task.

Context cloning, or the generation of a new context, requires allocation of storage for context data and the storing of initial values of the context data in the allocated storage. This enables a new task to be executed by the processing core.

For example, an ARMv8-A AArch64 context consists of user registers, TLS (thread local storage) registers TPIDR_ELO and TPIDDRO_ELO, page table base registers TTBRO and 20 TIBR1, and subsets of control registers CNTKCTLEL1, CNTP_CTLELO, CPACR_EL1, SCTLR, SCR, HCR, TCR, MDCR_EL2, MDCR_EL3, and PMUSERENR_ELO.

This present disclosure provides a method and apparatus for fast context cloning in a data processing system. One aspect of the disclosure is the use of a fast, two-layer copy-on-write (CoW) mechanism invention. A second aspect of the disclosure is the use of a Virtual Context Architecture (VCA), which provides an architecturally defined virtual context format. In combination, these aspects enable fast context cloning for a process (where the new process operates in a new virtual memory space) and thread (where the new thread operates in the same virtual memory space as the cloned thread).

Consistent with embodiments of the disclosure, a method is provided for cloning a context of a first program task executing on a processing element of a data processing system to enable execution of a second program task. The context of the first program task is described by first register values stored at a first register base address in a memory of the data processing system and a first address translation table stored at a first address translation table in the memory of the data processing system. The first address translation table is indicative of a mapping from a virtual memory space of the first program task to a system address space of the data processing system. The method includes copying the first register values to second register values stored at a second register base address in the memory of the data processing system and associating the second register base address with the second program task. Further, when the second program task is to be executed in a new virtual memory space, the method includes copying the first address translation table to a second address translation table at a second address translation table address in the memory system, associating the second task with the second address translation table address; and setting copy-on-write (CoW) bits in the first and second address translation tables. Execution of the second program task can then begin using the second context data, A mapping between the stored first register values and register values of the processing element is indicated by a first context format data stored in the memory of the data processing system. The cloning operation then includes copying the first context format data to a second context format data stored in the memory of the data processing system.

The first and second context format data and the first and second register values may be stored in a cache to allow fast copying and use of a coherence mechanism.

In accordance with certain embodiments of the disclosure, context cloning and switching is performed in hardware using a virtual context architecture as disclosed in co-pending U.S. patent application Ser. Nos. 15/361,871, 15/361,819, and 15/361,770, which are hereby incorporated by reference herein in their entirety, the mappings from virtual memory address space to system address space are maintained using range tables, as disclosed in co-pending patent application Ser. No. 15/649,930, which is hereby incorporated by reference herein in its entirety.

One aspect of context cloning the creation of a new virtual memory space that is mapped to a system address space. In accordance with certain embodiments of the disclosure, the mappings from virtual memory address space to system address space are maintained using range tables, as disclosed in co-pending patent application Ser. No. 15/649,930, which is hereby incorporated by reference herein in its entirety.

In accordance with certain embodiments of the disclosure, the mappings from system address space to physical address space are maintained by memory node controllers, as disclosed in co-pending patent application Ser. No. 15/650,008, which is hereby incorporated by reference herein in its entirety.

The second virtual context format data may include an indicator of the mapping between the stored second register values and register values of the processing element, the second register base address, and the second address translation table address. The second context format data is stored at a context format address.

An entry is written in a context table for the second program task where the entry includes the context format address of the second program task.

The first address translation table may include a first range table and the second address translation table may include a second range table.

Referring now to the drawings, FIG. 1 schematically illustrates a data processing system comprising: a plurality of processing elements (as examples of data handling nodes 20, 30), task management unit 40 and interconnect circuitry 50 connected to the plurality of data handling nodes and the task management unit. Task management unit 40 includes context table 42, to be discussed below, and in some embodiments, task management unit 40 is incorporated into one of processing element. Interconnect circuitry 50 comprises data routing circuitry 60 for controlling and monitoring data handling transactions as between the various data handling nodes and a coherency controller 70, to be discussed below.

The data handling nodes 20, 30 can include various types of node, such as, for example, a processing element such as a CPU (central processing unit, as an example of a data processing element) or CPU cluster, possibly with an associated cache memory; a memory; peripheral components such as input/output components, direct memory access (DMA) devices and so on. In the present example, they are processing elements. However, the present embodiments envisage arrangements with only one processing element and cache memory, and arrangements with more than one processing element. Indeed, a feature of the present arrangements is that in use, processing elements and/or cache memory devices may be added to the interconnected arrangement (for example by being newly connected or newly enabled for operation (such as powered up)), or may be removed from the interconnected arrangement (for example by being physically removed from the interconnected arrangement or by being logically removed, for example by being powered down). In an arrangement with a single processing element, the handshaking process discussed above could take place with itself (and in doing so, it would be detected that no other processing elements are present at that time). However, in other examples, two or more interconnected processing elements are used.

Each processing element in this example is associated with a cache memory 22, 32. The cache memories store locally and quickly accessible copies of data, for example data held in a higher-level memory 80 such as a main memory or a higher-level cache memory. Other processing or data handling resources 90 may also be connected to the interconnect circuitry 50.

The processing elements operating in a virtual memory space. Data in the cache memories may be indexed by a system address in a system address space. Translation from a virtual address to a system address may be performed by a translation look-aside-buffer (TLB) or a range table buffer (RTB). RTBs 24 and 34 are shown in FIG. 1. The use of range tables buffers is discussed in co-pending patent application Ser. No. 15/649,930, which is hereby incorporated by reference herein in its entirety. The RTB (24, 34) is shown to be accessed sequentially with the cache (22,32) for simplicity, in some embodiments the RTB is accessed in parallel with a virtually indexed system address tagged cache memory (22,32) where subsequent cache memories are accessed in the system address space. The data processing apparatus of FIG. 1 may be implemented as a single integrated circuit, for example as a so-called system on a chip (SoC) or a so-called network on a chip (NoC). Alternatively, the data processing apparatus of FIG. 1 may be implemented as multiple discrete and interconnected systems. The data processing apparatus of FIG. 1 is just one example of how a set of processing elements may be interconnected. In other examples, processing elements are interconnected by a bus, network, memory, RDMA (remote direct memory access, allowing a processing element of one computer to access the memory of another processing element of another computer without the involvement of either device's operating system), or equivalent device. Therefore, the interconnect circuitry 50 is simply an example indicative of various types of networking, interconnecting, bus or other circuitry to interconnect processing elements to allow the exchange of data and the switching of task execution in the manner described here.

In example embodiments, the interconnect circuitry may be an example of so-called cache coherent interconnect circuitry. Here, the term "coherent" refers to the maintenance of a correct relationship between multiple copies of the same data stored across the whole system. For example, data may be stored in a cache memory device 22 by one of the data handling nodes (such as the node 20). Other nodes (such as node 30) may be processing elements having their own respective cache 32 which, depending on the nature of the processing element operations, may store one or more copies of data which is also held in cache memory 22. In the case of a data handling access by one node to such information, there is a need to ensure that the accessing node is accessing the latest version of the stored information, and that if it makes any alteration to the stored information, either the other versions are correctly altered themselves or the other versions are deleted or invalidated. In general terms, caches 22 and 32 and coherency controller 70 provide coherent memory circuitry storing one or more copies of data accessible by each of the processing elements (for example, each of the processing elements connected via the interconnect circuitry 50), so that data written to a memory address in the coherent memory circuitry by one processing element is consistent with data read from that memory address in the coherent memory circuitry by another of the processing elements.

In examples, the coherent memory circuitry comprises two or more coherent cache memories (22, 32) and the coherent memory circuitry is configured to store one or more (for example, multiple) copies of the data accessible by each of the processing elements. In the example situation discussed above of devices being added to or subtracted from the interconnected arrangement, the coherency controller 70 can be arranged to react to the addition of a device by adding it to the so-called coherency domain, and bringing it into coherent operation with other devices in the interconnected arrangement, and to react to the subtraction of a device by reconfiguring the coherent domain to operate in the absence of that device. This reconfiguring may involve first ensuring (before the device is removed) that any data updates at that device are appropriately propagated to other coherent devices and/or the higher-level memory.

The data routing circuitry 60 and/or the coherency controller 70 include various mechanisms and circuitry to provide for coherent operation. An example processing element in the arrangement of FIG. 1 may make reference to data stored in an associated cache memory, with both the processing element and the cache memory being in communication with the interconnect circuitry. The cache memory may store copies of information held in the higher-level memory 80. In some instances, the two copies can be the same, for example if a copy has been cached during a memory read operation. In other instances, circumstances could arise which would lead to copies differing from one another, for example if a data write operation has been carried out by a particular processing element (such as the processing element 20) with respect to the copy of a data item stored in the cache 22. In a system of multiple caches, there is a need to ensure that before one version of a data item is accessed, any changes which have been implemented in respect of other versions are fully implemented for all copies. The role of logic associated with the cache coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then cache coherence logic avoids conflicts with other existing copies of the data item. Techniques for achieving this include (for example) the use of a so-called "snoop filter".

The term "snoop filter" is a historical one and is used here to refer to a control device forming part of the coherency controller 70 having an associated "directory", where the directory stores information indicating which data is stored in which cache, and the snoop filter itself at least contributes to the handling of data accesses to cached information so as to provide a cache coherence function.

The coherency controller 70 including the snoop filter provides an example of a cache coherency controller configured to coordinate, amongst the cache memories, an access to a memory address by one of the cache memories when the directory indicates that another of the cache memories is caching that memory address. The snoop controller stores or provides a directory such as the directory mentioned above indicating, for memory addresses cached by one or more of a group of one or more cache memories connectable in a coherent cache structure, which of the cache memories are caching those memory addresses.

In general terms, program functions are carried out by executing program code and referred to here as "tasks". An example of a task is a processing thread. Execution of a task may take place for a particular period and then the processing element can switch to execution of a different task before, potentially, returning to the first task for another period and so on. In between these periods, a so-called context switch takes place. The context switch involves saving a current state of the processing element at the end of execution of a particular task and restoring a previously saved stated of the processing element in preparation for a period of execution of another task. Overall, this can give the impression that the processing element is handling multiple programs or "threads" at once, whereas in fact it is executing small portions of each task intermittently. The creation and switching of tasks may be performed by task management unit 40. This will be discussed on more detail below.

Figure 2:
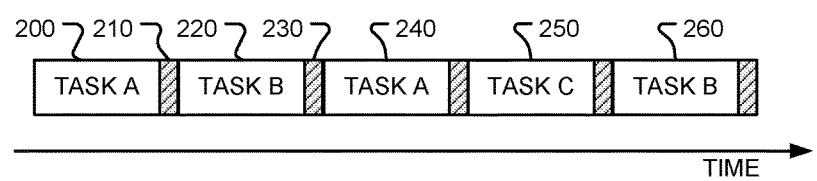
FIG. 2 schematically illustrates task switching by a processing element.

FIG. 2 schematically illustrates task switching by a processing element such as one of the processing elements 20, 30 of FIG. 1.

In the example of FIG. 2, the processing element executes, for a period 200, a first task (task A). There is then a short period 210 during which the context switch referred to above takes place. Here, the processing element saves context data relating to the program task A following execution of that program task by the processing element, and loads context data for execution of a next task (task B) in a period 220. The context data for task B may have been previously saved by that processing element or another processing element. Alternatively, new context data may be created. So, it can be seen that a particular processing element may execute a particular task for a period, but then having saved the context data relating to that task, execution of that task may next be taken up in a subsequent period by that processing element another of the interconnected processing elements.

At the end of execution of task B in the period 220, a context switch occurs in a period 230 followed by execution of task A again in a period 240, with subsequent tasks in this example being task C in a period 250 and task B in a period 260.

The arrangement of FIG. 2 relates to one of the processing elements. In the system of FIG. 1, there are two example processing elements and each may be switching between tasks in the manner shown. A particular task may be executed by successive (though not necessarily contiguous) periods of execution on any of the processing elements, with the saved context data being used to facilitate the switching of the task from one processing element to another.

The processing elements 20 and 30, shown in FIG. 1. and any other processing elements connected to the interconnect 50 have different processing capabilities for architecture. As such, the format and amount of data in a full context may be different for different processing elements. In such situations, data expected to form part of the context data by one processing element may be irrelevant to (or incapable of being used or understood by) another processing element, or a processing element may be incapable of providing context data which would otherwise be required by one of the other processing elements. This potential mismatch in the nature of the context data is handled in these example embodiments as discussed below. Upon initiation of the system (for example, power-on or reset, or at the addition of a device to or the subtraction of a device from the coherent domain), the processing elements communicate their own context requirements with the other processing elements and, through a handshaking process, a common set of context data is agreed. This common set of context data is then used in context switches by each of the processing elements. In examples, therefore, format selection circuitry is configured to communicate the format definition data and to determine the common set of data items for inclusion in the context data in response to a condition selected from the list consisting of: power-on of the apparatus; reset of the apparatus; addition of a device to the apparatus; and removal of a device from the apparatus.

As described in co-pending patent application Ser. No. 15/361,770, which is hereby incorporated by reference in its entirety, which is hereby incorporated by reference herein in its entirety, a processing element may provide a context format or "version" to the other processing elements. The context description may be an explicit list of context data items that are useable by that processing element. Alternatively, the context format may be a reference to such a list, for example, a context data version number or the like which unambiguously (at least among those devices in the interconnected arrangement) defines the nature of the context data required by that processing element. A common set of context data is derived, for example by the format selection circuitry, and communicated to each processing element. In an example in which the functionality of the format selection circuitry is distributed amongst the processing elements, this involves each processing element communicating its context version to each other processing element.

The common set of context data is used in task switching by each of the processing elements. This allows a task to be switched from any processing element to any other processing element in the set because the common context data is used at each task switch.

Therefore, in examples, each processing element has respective associated format definition data (such as the list or reference to a list discussed above) to define one or more sets of data items for inclusion in the context data, and this is communicated to other processing elements (for example by the format selection circuitry). The format selection circuitry handles the communication of the format definition data of each of the processing elements to others of the processing elements and determines, in response to the format definition data for each of the processing elements, a common set of data items for inclusion in the context data.

Operating according to the common set of context data may mean suppressing some advanced or specific functionality of more powerful processing elements in the set of processing elements connected to the interconnect 50. For example, if one processing element has a specialized computational unit such as a coprocessor, floating point unit or arithmetic logic unit but the other processing elements do not, then it may be appropriate for the processing element having that additional capability to suppress its use in order to be able to provide context data compatible with the other processing elements.

In a further embodiment, the processing elements 20, 30, shown in FIG. 1. and any other processing elements connected to the interconnect 50 have the same processing capabilities for architecture.

Figure 3:
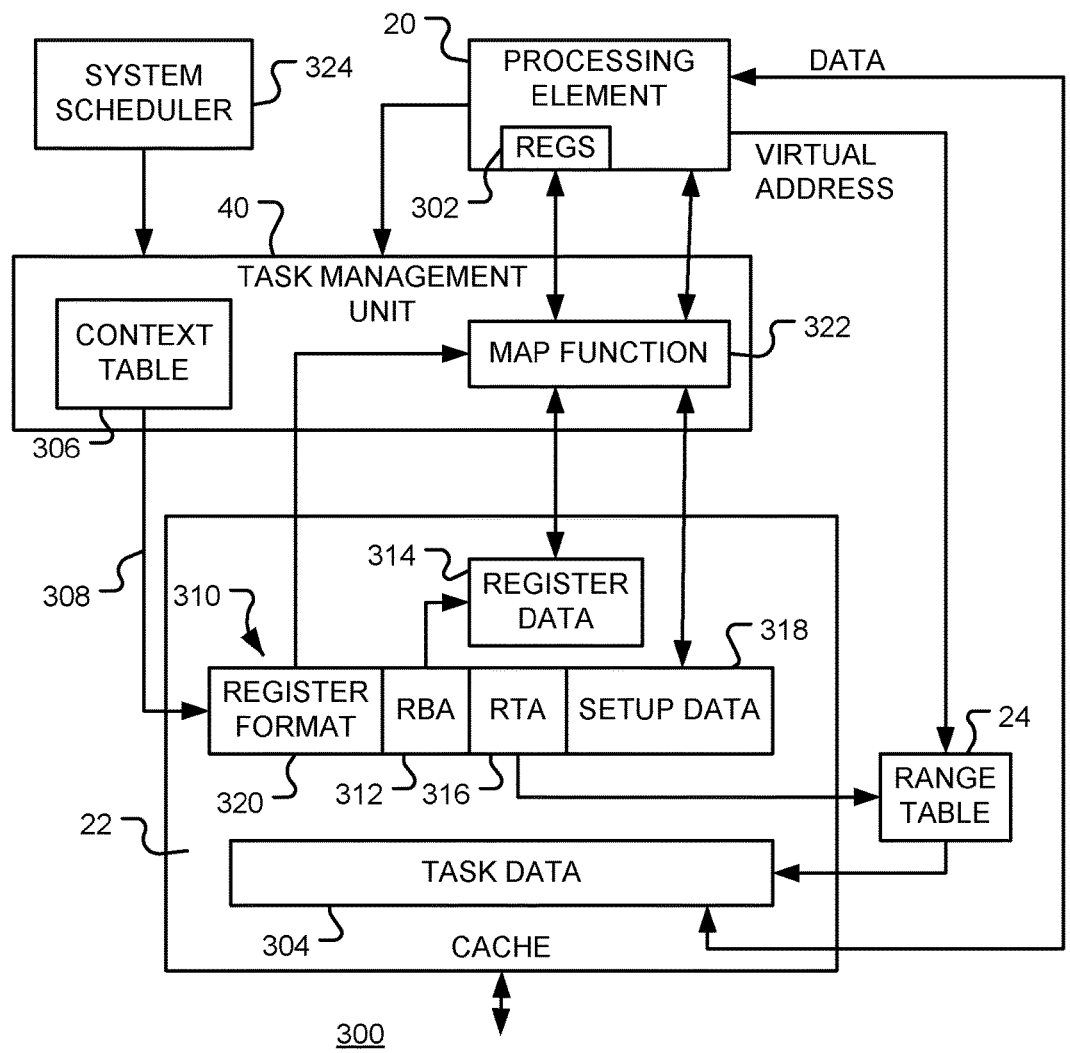
FIG. 3 is a block diagram of a portion of a data processing system, consistent with embodiments of the disclosure.

FIG. 3 is a block diagram of a portion 300 of a data processing system consistent with embodiments of the disclosure. Processing element 20 includes registers 302. When a task is executed by the processing element, the registers and data in a virtual memory space are accessed for reading and/or writing. Range table buffer 24, to be discussed below, provides a first level of address translation and translates an address the virtual memory space to a system address in a system address space. Multiple range table buffers may be present. Task data 304 held in cache 22 comprises copies of data associated with the system address. Task data may also be held in another cache of the data processing system, or in some other storage device. A coherence mechanism as described above, ensures that copies are up to date and consistent.

A context switch may be instigated by a scheduler in task management unit 40, by a signal from processing element 20 to task management unit 40, or through an external signal driven by a system scheduler mechanism 324. Context table 306 is accessed to determine the address tag 308 of virtual context format data 310 stored in cache 22. Virtual context format data 310 may include a register buffer address (RBA) 312 of saved register data 314 together with a range table address (RTA) 316 of range table 24. Additional setup data 318 is also stored, which provides subset of context data sufficient to begin or continue a task.

Virtual context format data 310 may include a register format 320 that identifies how register values stored in memory are mapped to registers of a processing element. This format is used by map function 322 to map the register data 314 and other setup data 318 to appropriate locations for configuring processing element 20.

In this way, a context switch may be performed in hardware by selecting a virtual context format 310, mapping register data 314 to the registers 302 of processing element 20, and selecting the appropriate range table 24.

When switching from one thread to another thread that uses the same virtual memory space, the same range table buffer is used.

In some embodiments, the disclosed mechanisms for fast context cloning are implemented in hardware. The mechanisms may be part of an instruction set architecture (ISA) enabling the mechanism to be accessed via an interface with an operating system, for example.

The disclosed mechanisms accelerate the memory portion of fast context creation or cloning.

In one embodiment, an ISA-level mechanism is used to clone a context. The mechanism takes the base address of a virtual context format and performs an optimized copy of necessary data structures based on the hardware defined format. The exact data structures to be copied are dependent on the type of clone operation needed.

Prior cloning operations are implemented as calls to an operating system rather than as an ISA-level mechanism. In the Linux operating system, for example, clone( ) is a system call that can be used to create a new thread of execution. Depending on the options passed, the new thread of execution can adhere to the semantics of a process in a UNIX operating system or a thread in a POSIX operating system, for example. Related functions such as fork( ) (which creates a new process in UNIX) and pthread_create( ) (which creates a new thread in POSIX) may call the clone( ) function.

An example clone( ) function may take the form:

```
int clone( int   (*fn) (void *),      /* parameter 1 */
           void *child_stack,         /* parameter 2 */
           int   flags,               /* parameter 3 */
           void *arg, ...             /* parameter 4 */
           ...
           /* pid_t *ptid, void *newtls, pid_t *ctid */ );
```

The first parameter (fn) provides the actual work function to be instantiated and services as the entry point of execution for the cloned process or thread. This is handled separately.

The second parameter (child_stack) specifies the location of the stack used by the child process. Since the child process and calling process may share memory, it is not possible for the child process to execute in the same stack as the calling process. The calling process must therefore set up memory space for the child stack and pass a pointer to this space to clone( ). When the stack is configured to grow downwards (as it is on most processors that run the Linux operating, for example), the child stack parameter points to the top-most address of the memory space set up for the child stack.

In response to a clone instruction, the parent process creates a new stack using an 'allocate' operation through the memory system. This creates a memory space which is passed to the child (created using clone) via parameter 2.

Consistent with certain embodiments of the disclosure, context cloning is provided as an ISA-level mechanism in a virtual context architecture. The context or state of a task is defined as part of the architecture and has at least one defined format.

When a context is cloned, the context format is copied and additional actions are performed to support separation or sharing of the virtual memory space.

Firstly, a clone operation consistent with the present disclosure provides a means to clone the context as defined by the virtual context architecture (VCA), which defines registers, setup information, debug registers, etc. need to start or continue a program task Secondly, a clone operation consistent with the present disclosure provides a means to specify a stack pointer (or 'null' to request a copy or copy-on-write (CoW) of a parent context virtual memory space).

Thirdly, a clone operation consistent with the present disclosure provides a means, such as a flag (e.g. CLONE_VM), to specify if a new address space is to be created or not.

In accordance with embodiments of the disclosure, an instruction, referred to herein as rclone( ) is provided in an ISA of a data processing apparatus. The instruction takes in three arguments: a pointer to a function to be executed, a stack pointer (to be allocated by the caller), and a flag bit to specify VM. For example, the instruction may take the form:

rclone <r1> <r2> <r3>, where r1 is a reference of type int (*fn)(void *), r2 is a reference to a stack pointer allocated by the parent or null for CoW of parent, and r3 is a flag to specify characteristics. Example flag values are: 0=do not clone VM and 1=clone VM.

The rclone function may be used for cloning both treads and processes. For example, when the POSIX function fork(2) is called, execution continues in the child from the point of the fork(2) call. In accordance with the present disclosure, the fork(2) instruction is replaced by a hardware implemented instruction of the form: rclone pc+4 <r2> <r3>.

In a further example, in order to implement something similar to pthread_create( ), the r1 takes the 'start_routine' parameter, which is the third parameter in a call to the POSIX instruction pthread_create( ).

Additional flags, such as the other flags specified by the Linux sched.h header, can be handled either as part of the context format (through additional flags to zero or keep specific sections of the copied parent context format), or as an operating system abstraction (CLONE_IO, CLONE_FS, etc).

Some operations are common to both the fork (no shared virtual memory) and thread create modalities (shared virtual memory). In both operations, the context format setup information (e.g. the first 64 bytes) is copied eagerly. That is, all bytes are copied in a single transaction. The stack pointer is either replaced by the one provided through the instruction invocation or if the memory address passed is equal to zero (null) then the callers stack is used via copy on write as described in co-pending patent application Ser. No. 15/649,930, which is hereby incorporated by reference herein in its entirety. The instruction base for the function pointer passed to the clone instruction is set as the start instruction. The rest of the steps are specific to the fork( ) and thread_create( ) type of functions and their hardware analogs. Extensions to this simple instruction could have additional flags that could modify other bits within the VCA context format setup space, or add additional behavior. By using the copy-on-write as described in co-pending patent application Ser. No. 15/649,930, which is hereby incorporated by reference herein in its entirety, combined with the virtual context architecture register format architecture as disclosed in co-pending U.S. patent application Ser. Nos. 15/361,871, 15/361,819, and 15/361,770, which are hereby incorporated by reference herein in their entirety, these functions can be made more efficient, requiring fewer instructions and with very few memory operations outside of the core (decreasing the overhead from several thousand instructions in current systems along with the potential for several kilobytes of traffic with each clone operation).

The fork( ) operation is described below. In addition to the common steps listed in the previous paragraph, the differentiating factor is the way the virtual memory is handled when using the virtual context architecture. For a new process virtual memory space, once the setup information is eagerly copied, the range table is also copied. The virtual context contains a base pointer that is the range table base address (head of the range table). This pointer is accessed and the range table is eagerly copied. Since, for a given context, the format of the context data is defined in the architecture, the hardware knows which field of context data contains the range table pointer. Memory for new range table may be allocated directly by the hardware. Further memory can be copied entirely off-chip for the range given and a corresponding system address returned to the calling processing element.

One aspect of context cloning is copying of a virtual memory space. In some embodiments, mapping between virtual memory addresses and system memory addresses is performed using a range table buffer. A two-layer copy-on-Write (CoW) mechanism may be used so that a task may be started with minimum latency. In a CoW mechanism, a range of virtual memory addresses and a copy of that range are mapped to the same first system address range in the data processing system until an address in the virtual memory address range, or its copy, is written to. The common system address range includes a number of divisions. Responsive to a write request to an address in a division of the common address range, a second system address range is generated. The second system address range is mapped to the same physical addresses as the first system address range, except that the division containing the address to be written to and its corresponding division in the second system address range are mapped to different physical addresses. First layer mapping data, for translating a virtual memory address to a system address, may be stored in a range table buffer and updated when the second system address range is generated. Second layer mapping data, for translating a system address to a physical address in a data resource, may be stored in a system-to-physical translation cache that is updated when shared data is modified. Thus, a two-layer, copy-on write mechanism is provided for a data processing system.

Figure 4:
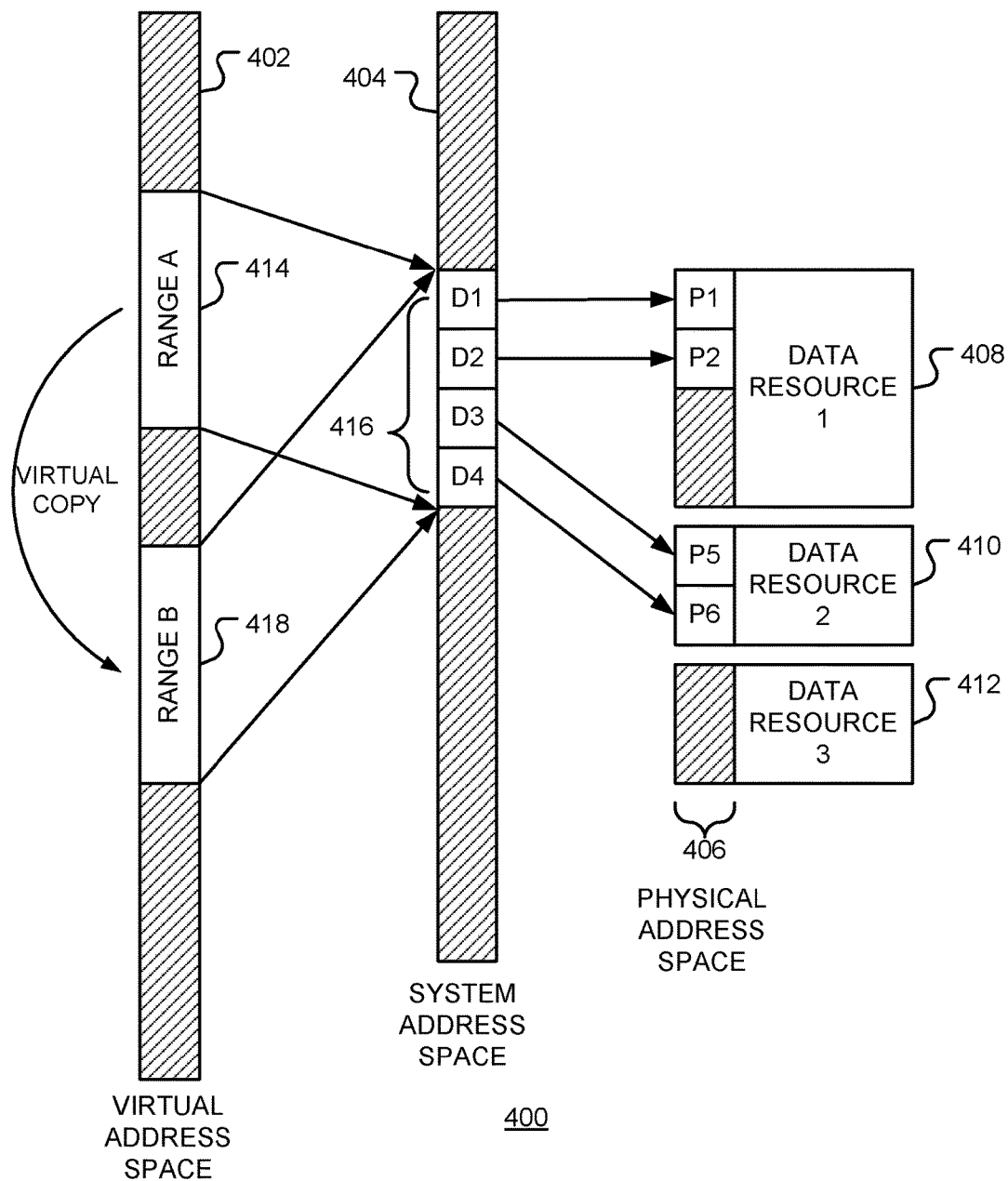
FIG. 4 illustrates a logical arrangement of memory in a data processing system, consistent with embodiments of the disclosure

FIG. 4 illustrates a logical arrangement of memory 400 in a data processing system, consistent with embodiments of the disclosure. The memory arrangement includes a virtual memory address space 402. Although a single virtual memory address space 402 is shown in FIG. 4, each program or device sees its own virtual memory address space that contains instructions and data for use by that program or device. Programming threads may share the same virtual memory address space. The use of virtual memory addressing allows memory access to by controller by inhibiting one program from accessing or corrupting information used by another program. Memory arrangement 400 also includes a system address space 404. The system address space allows access to addressable units in the data processing system, such as memory, storage, hardware accelerators and network interface controllers. The system address space may contain both physical (memory backed) addresses and virtual memory addresses. Memory arrangement 400 also includes a physical address space 406 that contains physical addresses in data resources such a memory devices or storage devices, for example. Data resources 408, 410 and 412 are shown in FIG. 4, but a data processing system may have any number of data resources.

In accordance with embodiments of the disclosure, the one or more virtual memory address spaces are divided into address ranges, such as address range 414 (RANGE A), in FIG. 4. Each range may be defined by two parameters, such as start and end addresses, a start address and an extent (length), or offsets from a reference address, for example.

In accordance with embodiments of the disclosure, each range in the virtual memory address space is mapped to a corresponding range in the system address space. For example, virtual memory address range 414 is mapped to system address range 416. Each system address range is further divided into a number of divisions. In the example shown in FIG. 4, the system address range 416 has four divisions, denoted as D1, D2, D3 and D4. In the sequel, it is assumed that each division corresponds to a page of memory or storage, but other sized divisions may be used without departing from the present disclosure. The mapping is referred to as a first layer mapping and may be recorded and implemented using a range table buffer, for example.

Each division of a system address range is mapped to a page in a data resource. For example, division D1 is mapped to page P1 in data resource 108, division D4 is mapped to page P6 in data resource 410, etc. This mapping is referred to as a second layer mapping and may be recorded and implemented in a system-to-physical translation cache, for example.

When a process or thread requests a copy of virtual memory address range 114, a new virtual memory address range 418 (RANGE B) is created. Original virtual memory address range 414 is referred to as the 'parent' virtual memory address range, while the new virtual memory address range 418 is referred to as the 'child' memory address range. The child range may be in the same virtual memory space 402 or in a different virtual memory space. This operation is referred to as a virtual copy, since no data has been moved in any physical data resource. The child virtual memory address range 418 is mapped to the same system address range, 116, as the parent virtual memory address range 414. However, a new mapping (from virtual memory address to system address) is generated for the child range. This is discussed in more detail below.

Operation may continue as long as no data is modified in range 414 or range 418. Thus, copying of the actual data is deferred. However, if data in range 414 or 418 is modified, by a write command for example, a physical copy of the modified data must be made since the data can no longer be shared.

Figure 5:
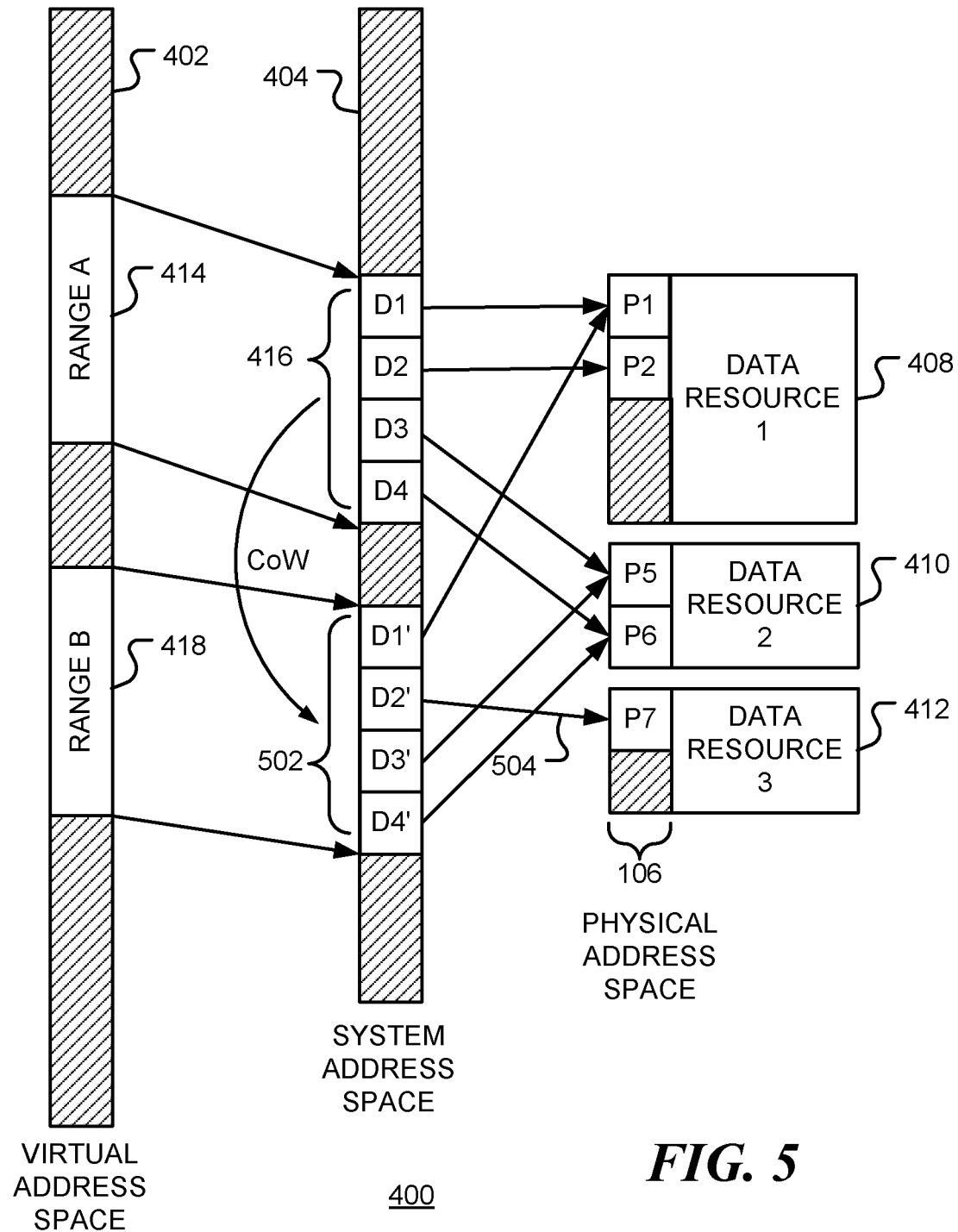
FIG. 5 shows memory after data in a range has been modified and a physical copy of the data has been made.

FIG. 5 shows memory 400 after data in a range has been modified and a physical copy of the data has been made. In the example shown, it is assumed that a write request was issued for an address in child virtual memory address range 418 and that the address is mapped to division D2 of the system address range. After the write, parent range 414 and child range 118 cannot share division D2, so a two-layer copy is performed. Firstly, a copy 502 of the system address range 416 is made, in the system address space 404, and the associated mapping from virtual memory address range 418 to system address range is updated. Copied system address range 502 has four divisions, denoted as D1', D2', D3' and D4', which correspond to the divisions D1, D2, D3 and D4 in system address range 416. After the write (to either division D2 or D2'), data associated with divisions D2 and data associated with division D2' must be stored in different pages. In this example, D2 remains stored in page P2 of data resource 108, while data in the division D2' in the copied range 502 is to be stored in page P7 in data resource 412. A new mapping, including element 504, is generated to indicate how system address range 402 is mapped to physical addresses. Alternatively, data in division D2' could remain stored in page P2 of data resource 408, while data in the division D2 in the original range 416 is stored in page P7 in data resource 412, since a computing device does not need knowledge of the second layer mapping.

In this manner, only a single additional page of physical storage is needed, rather than storage for the complete copied range 502.

An advantage of this approach is that copying of data is deferred until data is actually modified (and may be avoided all together is future accesses are 'read only'). A further advantage is that only modified divisions of the system address range are copied, rather than the complete range, thereby minimizing resource usage. The approach is termed a 'two-layer, copy-on-write' mechanism, since two separated mappings are maintained and updated (those mappings being the virtual to system address mapping defined by the range within the range table and the separate system address to physical page mapping within the memory node controller), and no physical data is copied until a write operation is requested.

In accordance with further aspects of the disclosure, mechanisms are provided for maintaining and updating the mapping from a virtual memory address space to a system address space and the mapping from a system address space to a physical address space. In one embodiment, the mechanisms are provided by a first memory address translation apparatus and a second memory address translation apparatus, respectively. The first address translation apparatus is accessible by one or more computing devices that use one or more virtual memory address spaces, and is configured to translate between a virtual memory address in a first range of virtual memory addresses to a system address in a first range of system addresses. The second memory address translation apparatus includes data resource allocation circuitry to allocate resources of one or more data resources, and a system-to-physical address translator, such as a cache, configured to translate a system address in the first range of system addresses to a physical address in the physical address space of a data resource of the one or more data resources. The data processing system is responsive to a copy request for a given virtual memory address in the first (parent) range of virtual memory addresses (414 in FIG. 4) to generate a second (child) range of virtual memory addresses (418 in FIG. 1). Subsequent to the copy request, but prior to a write operation in the parent or child range of virtual memory addresses, the first address translation apparatus is configured to translate both the parent and child ranges of virtual memory addresses to the same range of system addresses, 416.

Referring again to FIG. 5, after a virtual copy, the parent system address range 416 comprises parent divisions D1 . . . D4 and the child system address range 502 comprises corresponding child divisions D1' . . . D4'. Subsequent to a write operation to a system address in a first parent division, the second memory address translation apparatus is configured to allocate space in a data resource for storing a copy of data in the first parent division or the data to be written, update the system-to-physical address translation cache to include the child system address range, and update the system-to-physical address translator cache to map either first parent division or the corresponding second child division to the allocated space in the data resource. The system-to-physical address translator cache is updated to map the child divisions to the same physical addresses as the parent divisions, except that the first parent division and the corresponding child division are mapped to different physical addresses.

Figure 6:
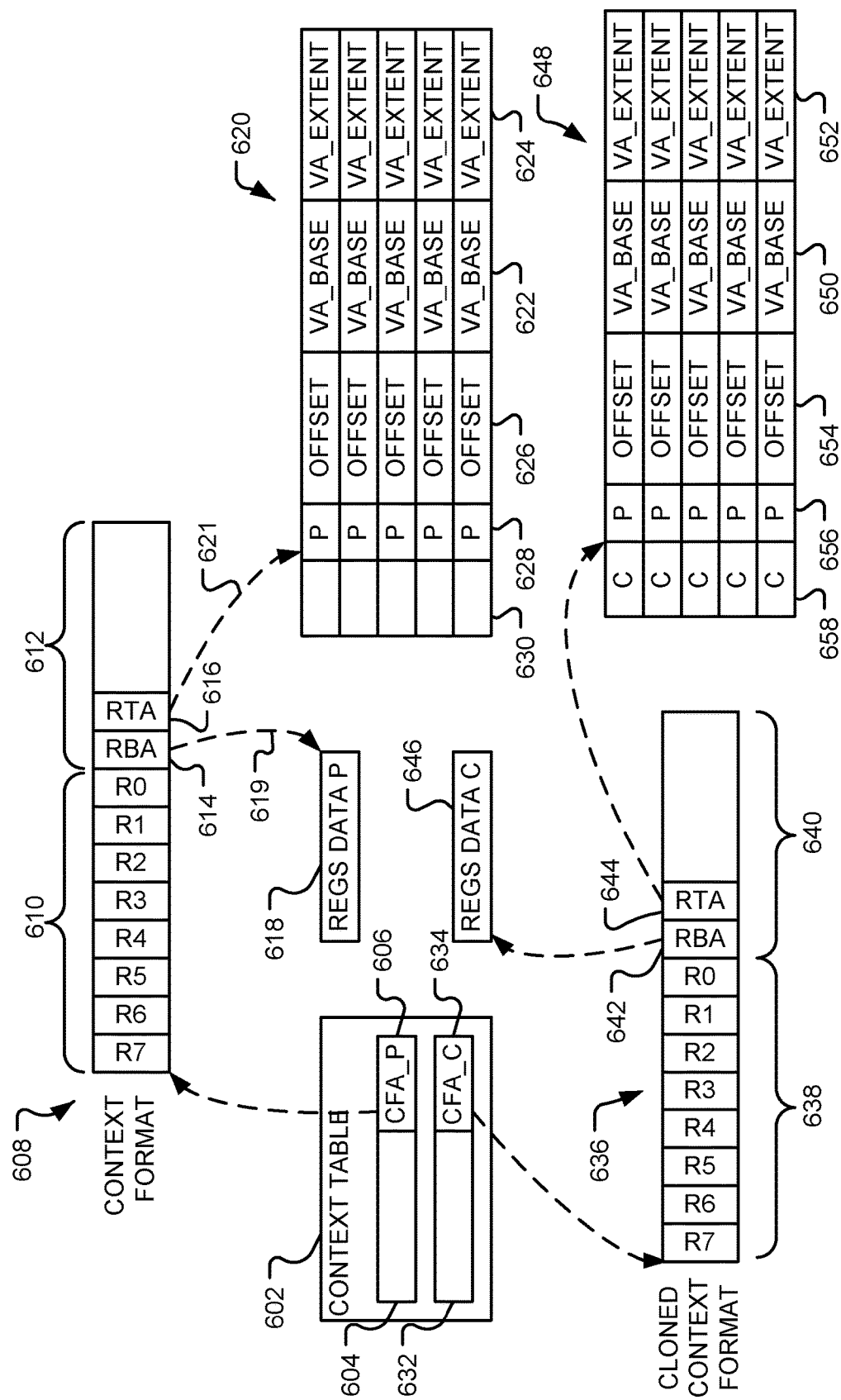
FIG. 6 illustrates a cloning operation consistent with embodiments of the disclosure.

FIG. 6 illustrates a cloning operation consistent with embodiments of the disclosure. In the example embodiment shown, context table 602 includes a number of entries that each records data related to an associated program task. Entry 604 corresponds to a parent task whose context is to be cloned. Included in entry 604 is a context format address 606 of the parent task that identifies parent virtual context format 608. Parent virtual context format 608 includes register format information 610 and context format setup information 612. Virtual context format 608 indicates to the hardware how virtual context data is to be handled. Included in context format setup information 612 are a register base address (RBA) 614 and a range table address (RTA) 616. Register base address (RBA) 614 indicates the memory location of register data 618 of the parent task, as indicated by arrow 619, while range table address (RTA) 616 indicates the memory location of a range table 620 of the parent task, as indicated by arrow 621.

Range table 620 includes a number of entries or rows each containing address range boundary values corresponding to a range of virtual memory addresses. In the embodiment shown, the address range boundary values in parent range table entry include a virtual memory address base value 622 (VA_BASE) and a virtual address extent 624, (VA_EXTENT). These indicate an address range from VA_BASE to VA_BASE+VA_EXTENT. Field 626 contains an offset that, when added to a virtual memory address, indicates the system address corresponding to the virtual memory address. Thus, the offset value is used to translate a virtual memory address to a system address. The range table entry also includes a permissions field 628, which may contain memory access permission or other administrative data, and copy-on-write (CoW) data 630 that is cleared initially. Range table 620 enables translation from a virtual memory and a system memory address. Other address translation mechanisms may be used without departing from the present disclosure. Known address translation mechanisms may use an address translation table, for example, that describes a mapping between the virtual memory space and the system address space.

Thus, elements 608, 618 and 620 describe the virtual context of a program task.

In order to clone an existing parent context, a new entry 632 is created in the context table 602. The new entry includes a context format address 634 (CFA_C) of the child context to be created. The address 634 identifies the location of a cloned or child virtual context format 636. Child virtual context format 636 is copied from parent virtual context format 608, and includes register format information 638 and context format setup information 640. Included in context format setup information 640 are a register base address (RBA) 642 and a range table address (RTA) 644. In the cloned child context, register base address (RBA) 642 indicates the memory location of child register data 646 of the child task, while range table address (RTA) 642 indicates the memory location of a range table. If a new virtual memory space is to be created, a duplicate range table 648 is created from range table 620. The duplicate range table 648 contains fields 650, 652, 654, 656 and 658 copied from corresponding fields 622, 624, 626, 628 and 630 of the parent range table 620. In the new range table 648, copy-on-write (CoW) bits 658 are set to indicate that the table is a copy and that corresponding data is currently shared between the parent and child program tasks. Corresponding CoW bits 630 are also set in the parent range table 620. If no new virtual memory space is to be created, RTA 644 is the address of parent range table 620.

In this point, even though no data at system addresses has been copied, execution of a second program task can begin. Thus, the context creation is achieved with very little latency and using few instructions.

The shared state condition, indicated by the CoW bit, can be maintained until interrupted by a write to either the parent or the child virtual memory address range. When that happens, the range that made the write initiates a hardware-driven clone operation. This clone operation takes in the base system address and range (both available to the hardware) and returns a new system address and range. From the perspective of the cloned process, the virtual addresses never change. In the case that the data was written by the device using the child range, the offset value in field is updated to reflect the new system range. A second layer of copy on write as described in co-pending patent application Ser. No. 15/649,930, which is hereby incorporated by reference herein in its entirety.

Figure 7:
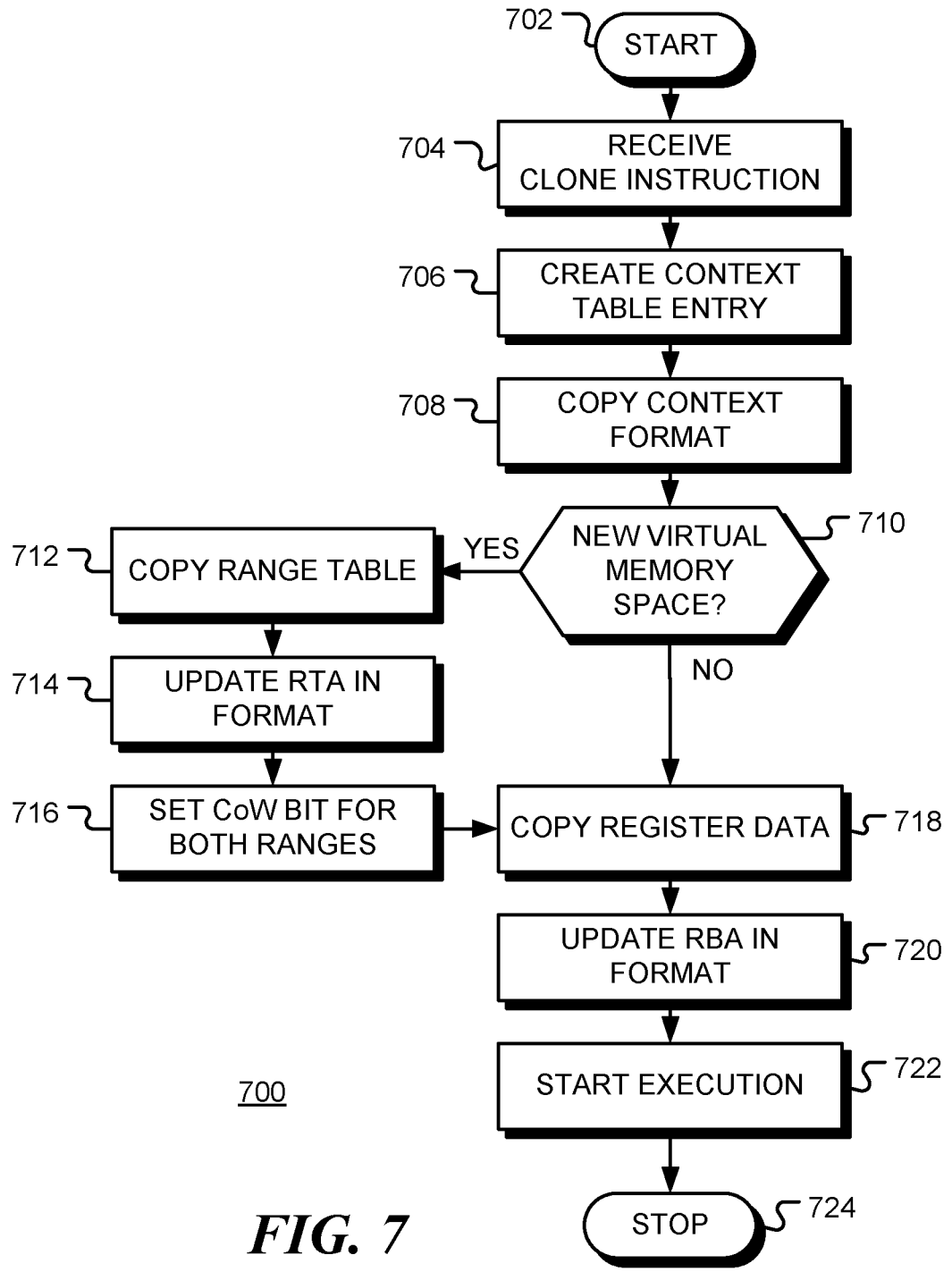
FIG. 7 is a flow chart of a method for cloning a parent context in a data processing system to create a child context, consistent with certain embodiments of the disclosure.

FIG. 7 is a flow chart of a method 700, consistent with certain embodiments of the disclosure, for cloning a parent context in a data processing system so as to create a child context. Following start block 702, a 'clone' instruction is received at block 704. At block 706, a new entry, associated with the new child context, is created in a context table. The new entry includes a reference to memory allocated for a new virtual context format. At block 708, the parent virtual context format is copied to the child virtual context format. The virtual context formats indicate to the hardware how stored context data is to be interpreted. At decision block 710, it is determined if a new virtual memory space is to be created. This may be indicated by a flag in the clone instruction, for example. A new virtual memory space may be needed if the cloned context is to be used for a process, for example. A new virtual memory space may not be needed if the cloned context is to be used for a processing thread. If a new virtual memory space is needed, as depicted by the positive branch from decision block 710, the parent range table is copied to a child range table at block 712. The child range table will be used to translate virtual addresses in the new virtual memory space to system addresses, as discussed above. At block 714, the range table address (RTA) in the child context format is updated with the address of the new range table. At block 716, copy-on-write (CoW) bits are set in both parent and child range tables to indicate that the memory space is initially shared between parent and child tasks. Flow then continues to block 718 where the parent register data is copied. Flow also continues to block 718 if no new virtual memory space is needed. At block 720, the register base address (RBA) is updated to indicate the address of the child register data. Execution of the new task in the cloned context begins at block 722 and the cloning process terminates at block 724. This method provides a very fast cloning of the parent context.

Figure 8:
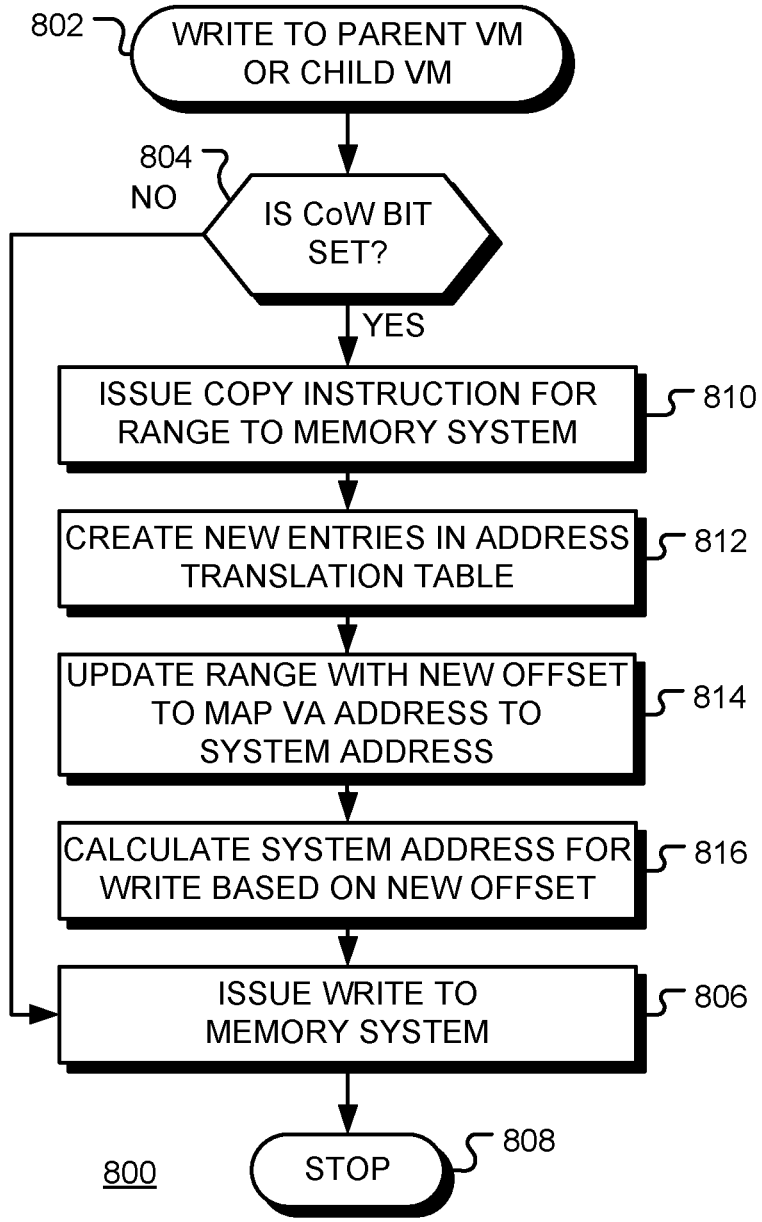
FIG. 8 is a flow chart of a method for performing a write operation in data processing system, consistent with embodiments of the disclosure.

FIG. 8 is a flow chart of a method 800 for handling a write operation in data processing system. Following a write instruction to a virtual memory address at start block 802, the address is looked up in the range table to determine if the CoW bit in the corresponding entry is set. If the CoW bit is not set, as depicted by the negative branch from decision block 804, the memory is not shared, so the write instruction is issued to the memory system at block 806 and the process terminates at block 808. However, if the CoW bit is set in the range table entry, as depicted by the positive branch from decision block 804, a copy request is issued, at block 810, to the memory system associated with the range containing the system address to be written. At block 812, the memory system creates a new system range and updates its system-to-physical translation table to map the new system range to physical addresses. The memory system also allocates new physical storage and copies, to the allocated storage, the division or page that containing the address to be written to. At block 814, the offset and virtual memory address base are updated in the range table of the device that issued the write request and the CoW bit is cleared. At block 816, the virtual memory address to be written is translated to a system address using the new offset in the range table. Finally, a corresponding write instruction is issued to the memory system at block 806.

Inside the memory system, the page or other memory division to which the write is directed is calculated. The page is then allocated new physical memory and copied. This operation may be performed at the memory controller level either on-chip or off-chip, and can take advantage of in-technology copy techniques such as buffer-buffer copy and in-SSD copy, for example. Once copied, the write is submitted to the new page. All the other pages still point to the parent pages as they are "clean" and exactly the same as the parent pages. In this way, the second layer of copy-on-write provides the same or better performance than a standard copy-on-write system given that the main processing core does not have direct participation. At this point the two layer "fast" copy-on-write process is complete and the process terminates at block 808.

In the first layer copy-on-write, the new system range is generated. In the second layer copy-on-write, a new mapping from system to physical addresses is generated, but only the written-to physical pages are actually copied. The remaining pages still map to the physical pages of the parent range (until they too written to). As discussed above, each system range is subdivided into physical pages or other divisions whose metadata (such as actual location, empty/allocated, etc.) is represented within an efficient data structure. The data structure may be a B-Tree, sparse tree, or other self-balancing search tree, for example. Upon receiving a copy operation, a new set of pages is set up so that they initially point to the parent range's pages. Upon receiving a write (to a real address), the page that it falls into is calculated (e.g., using a hash), and the page is checked to see if it has a CoW bit set (within the hardware data structure mapping physical pages, again, e.g., a B-Tree). If the CoW bit is set, then a new physical page is allocated (on one of the available memory technologies, such as DRAM/NV/SSD/etc.) and the page is copied. Optionally, the metadata for the page may is copied.

Read accesses to memory are often more frequent than write accesses. Therefore, keeping the initial step on the core itself (for example by copying the range table entry and setting a bit) significantly speeds up the critical path of the copy or clone operation. Moving the actual physical copying of memory to the memory fabric enables the OS and core to continue on computing, moving the slow write operation off the critical path.

The various embodiments and examples of the present disclosure as presented herein are understood to be illustrative of the present disclosure and not restrictive thereof and are non-limiting with respect to the scope of the present disclosure.

Further particular and preferred aspects of the present disclosure are set out in the accompanying independent and dependent claims. Features of the dependent claims may be combined with features of the independent claims as appropriate, and in combinations other than those explicitly set out in the claims.

Components of the data processing system may be implemented in an integrated circuit. The circuit may be defined be a set of instructions of a Hardware Description Language (HDL) instructions, which may be stored in a non-transient computer readable medium, for example. The instructions may be distributed via the computer readable medium or via other means such as a wired or wireless network. The instructions may be used to control manufacture or design of the integrated circuit, and may be combined with other instructions.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items:

1. A method for cloning a first context of a first program task executing on a processing element of a data processing system to enable execution of a second program task, where the first context of the first program task is described by: first register values stored at a first register base address in a memory of the data processing system; and first address translation table stored at a first address translation table in the memory of the data processing system, where the first address translation table is indicative of a mapping from a first virtual memory space of the first program task to a first system address space of the data processing system; the method comprising: producing a second context by: copying the first register values to second register values stored at a second register base address in the memory of the data processing system; associating the second register base address with the second program task; when the second program task is to be executed in a new virtual memory space: copying the first address translation table to a second address translation table at a second address translation table address in the memory system; associating the second task with the second address translation table address; and setting copy-on-write (CoW) status bits in the first and second address translation tables, and beginning execution of the second program task using the second context data.

2. The method of item 1, where a mapping between the stored first register values and register values of the processing element is indicated by first virtual context format data stored in the memory of the data processing system.

3. The method of item 2, further comprising copying the first virtual context format data to second virtual context format data stored in the memory of the data processing system.

4. The method of item 3, where the first virtual context format data and the second virtual context format data stored in a cache.

5. The method of item 3, where the second virtual context format data comprises: an indicator of the mapping between the stored second register values and register values of the processing element; the second register base address; and the second address translation table address, and where the second context format data is stored at context format address.

6. The method of item 3, further comprising: creating an entry in a context table for the second program task where the entry includes the context format address of the second program task.

7. The method of item 1, where the first address translation table comprises a first range table and the second address translation table comprises a second range table.

8. The method of item 7 where, when the second program task is to be executed in the new virtual memory space, the method further comprises: subsequent to beginning execution of the second program task: when a write occurs to a memory address in the first virtual memory space that is mapped to a first division of the system address space and for which an associated copy-on-write (CoW) status bit is set: allocating space in a physical memory device of the data processing system; copying data associated with the first division to the allocated space; updating a system-to-physical address mapping to include a new system memory range having a second division that maps to the allocated space; updating the second range table to translate the new virtual memory space to the new system memory range; translating the memory address to a system address in the new system memory range; writing the system address; and clearing the copy-on-write (CoW) status bits in the first and second range tables.

9. The method of item 1, where the first register values are stored in one or more first lines of a cache memory and copying the stored first register values at the first register base address to second register value at the second register base address comprises: copying the one or more first lines to one or more second lines of the cache memory; and associating the one or more second lines with the second register base address.

10. A data processing system comprising: a memory system having one or more physical memory devices, where the memory system is addressable by addresses in a system address space having a plurality of address ranges, each address range of the plurality of address ranges having one or more divisions; a first processing element, where a first context of the first processing element, associated with execution of a first program task, is described by first context data stored in the memory system, where the program task uses a first virtual memory space, and where one or more divisions of the system address space are allocated to the first context data; a first address translator that translates an address in the first virtual memory space to an address in the system address space using a first range table stored at a first range table address, where the first context data includes the first range table address; a second address translator that translates an address in the system address space to an address in a physical device of the one or more physical memory devices of the memory system using a system-physical address mapping; and a task management unit, where the task management unit is responsive to an instruction to provide second context data, descriptive of a second context of a second program task, by: copying the first context data to second context data; copying the first range table to a second range table at a second range table address; setting copy-on-write bits in the first and second range table; replacing the first range address with the second range address in the second context data; and beginning execution of the second program task in the first virtual memory space using the second range table.

11. The data processing system of item 10 where, when the second program task is a process, the task management unit is further responsive to the instruction from the first processing unit to provide second context data by: subsequent to beginning execution of the second program task: when a write occurs to an address in the first virtual memory space that is mapped to a first division of the system address space and for which an associated copy-on-write bit is set: allocating space in a physical memory device the one or more physical memory devices; copying data associated with the first division to the allocated space; updating the system-physical address mapping of the second address translator to include a new system memory range having a second division that maps to the allocated space; updating the second range table to translate the address in the first virtual memory space to the new system range; and clearing the copy-on-write bits in the first and second range tables.

12. The data processing system of item 10, where a division of the system address space comprises a cache line.

13. The data processing system of item 10, where the memory system comprises a coherent memory system and where the data processing system further comprises: one or second processing elements that share the coherent memory system with the first processing element.

14. The data processing system of item 10, where a description of the format of the first context data is stored in the memory system as first virtual context format data, the first virtual context format data comprising: a register format date that describes a mapping of processing element registers to memory addresses; and context setup data, where the context setup data includes a register base address associated with stored register values and a range table address associated with the first range table.

15. The data processing system of item 14, where the task management unit is further responsive to the instruction from the first processing unit to provide second context data by: copying the first virtual context format data to second virtual context format data; adding an entry to a context table, where the entry is associated with the second program task and includes a reference to the second virtual context format data, where the context table includes an entry associated with the first program task, that entry having a reference to the first virtual context format data.

16. The data processing system of item 10, where the second context data is provided in response to a signal from the first processing unit, a scheduler in the task manager or an external signal driven by a system scheduler mechanism.

17. A non-transient computer readable medium having instructions of a hardware description language or netlist representative of the data processing system of item 10.

18. A data processing system comprising: a memory system; a processing element; a first address translator configured to map virtual addresses to system addresses; a second address translator configured to maps system address to physical addresses; and a task management unit; where a first program task uses a first virtual memory space that is mapped to a first range of system address using a first range table, where a context of the first program task includes an address of the first table and is cloned by creating a second range table indicative of a mapping from a second virtual address space to a second range of system addresses, where the second range of system addresses is mapped to the same physical addresses as the first range until a write occurs, at which time memory is allocated and the mapping of the second range is updated, and where the cloned context includes an address of the second range table.

19. The data processing system of item 18, where a context comprises: virtual context format data including a register buffer address (RBA) of saved register data and a range table address (RTA) of a range table; a register format that identifies how register values stored in memory are mapped to registers of the processing element; and a subset of context data sufficient to begin or continue a program task.

20. The data processing system of item 19, where cloning of the context of the first program task is performed in hardware by selecting a virtual context format, mapping register data to registers of the processing element, and selecting an appropriate range table.

The invention claimed is:

1. A data processing system comprising:
a memory system;
a processing element;
a first address translator configured to map virtual addresses to system addresses;
a second address translator configured to maps system address to physical addresses; and
a task management unit;
where a first program task uses a first virtual memory space that is mapped to a first range of system address using a first range table,
where a context of the first program task includes an address of the first range table and is cloned by creating a second range table indicative of a mapping from a second virtual memory space to a second range of system addresses, where the second range of system addresses is mapped to the same physical addresses as the first range until a write occurs, at which time memory is allocated and the mapping of the second range is updated, and
where the cloned context includes an address of the second range table.

2. The data processing system of claim 1, where divisions of system addresses in the first and second range tables that are mapped to the same physical addresses are indicated by setting copy-on-write bits in the first and second range tables.

3. The data processing system of claim 2 where subsequent to beginning execution of a second program task in the cloned context:
when a write occurs to an address in the first virtual memory space that is mapped to a first division of the system address space and for which an associated copy-on-write bit is set:
allocating space in a physical memory device of the memory system;
copying data associated with the first division to the allocated space;
updating the system address to physical address mapping of the second address translator to include a new system address range having a second division that maps to the allocated space;
updating the second range table to translate the address in the first virtual memory space to the new system address range; and
clearing the copy-on-write bits in the first and second range tables.

4. The data processing system of claim 2, where a division of the system address space comprises a cache line.

5. The data processing system of claim 1, where the memory system comprises a coherent memory system, where the processing element comprises a first processing element, and where the data processing system further comprises:
one or more second processing elements that share the coherent memory system with the first processing element.

6. The data processing system of claim 1, where the context of the first program task is cloned in response to a signal from the processing unit, a scheduler in the task manager or an external signal driven by a system scheduler mechanism.

7. A non-transient computer readable medium having instructions of a hardware description language or netlist representative of the data processing system of claim 1.

8. The data processing system of claim 1, where a context comprises:
- virtual context format data including a register buffer address (RBA) of saved register data and a range table address (RTA) of a range table;
- a register format that identifies how register values stored in memory are mapped to registers of the processing element; and
- a subset of context data sufficient to begin or continue a program task.

9. The data processing system of claim 8, where cloning of the context of the first program task is performed in hardware by selecting a virtual context format, mapping register data to registers of the processing element, and selecting an appropriate range table.

10. The data processing system of claim 1, where:
- the system addresses are located in a system address space having a plurality of address ranges, each address range of the plurality of address ranges comprising one or more divisions, and
- the memory system comprises one or more physical memory devices and is addressable by the system addresses using the second address translator.

11. A method comprising:
- executing a first program task in a processing element of a data processing system, where the first program tasks uses a first virtual memory space that is mapped, by a first address translator, to a first range of system addresses using a first range table, where the first range of system addresses is mapped, by a second address translator, to physical addresses in a memory system of the data processing system and where a context of the first program task includes an address of the first table;
- cloning the context of the first program task, to produce a context for a second program task, by creating a second range table indicative of a mapping from a second virtual address space to a second range of system addresses, where the second range of system addresses is mapped, by the second address translator, to the same physical addresses in the memory system as the first range until a write to a mapped physical address occurs and where the context of the second program task includes an address of the second range table; and
- when a write to a mapped physical address occurs:
  - allocating memory in the memory system; and
  - updating the mapping of the second range in the second range table.

12. The method of claim 11 where the system addresses are located in a system address space having a plurality of address ranges, each address range of the plurality of address ranges comprising one or more divisions, and where divisions of system addresses in the first and second range tables that are mapped to the same physical addresses in the memory system are indicated by setting copy-on-write bits in the first and second range tables.

13. The method of claim 11, where a context comprises:
- virtual context format data including a register buffer address (RBA) of saved register data and a range table address (RTA) of a range table;
- a register format that identifies how register values stored in memory are mapped to registers of the processing element; and
- a subset of context data sufficient to begin or continue a program task.

14. The method of claim 13, where cloning of the context of the first program task is performed in hardware by selecting a virtual context format, mapping register data to registers of the processing element, and selecting an appropriate range table.

15. The method of claim 12, further comprising, during execution of the second program task in the cloned context:
- when a write occurs to an address in the first virtual memory space that is mapped to a first division of the system address space and for which an associated copy-on-write bit is set:
  - allocating space in a physical memory device of the memory system;
  - copying data associated with the first division to the allocated space;
  - updating the system address to physical address mapping of the second address translator to include a new system address range having a second division that maps to the allocated space;
  - updating the second range table to translate the address in the first virtual memory space to the new system address range; and
  - clearing the copy-on-write bits in the first and second range tables.

16. The data processing system of claim 12, where a division of the system address space comprises a cache line.

* * * * *